United States Patent
Paczkowski et al.

(10) Patent No.: US 9,779,232 B1
(45) Date of Patent: Oct. 3, 2017

(54) TRUSTED CODE GENERATION AND VERIFICATION TO PREVENT FRAUD FROM MALEFICENT EXTERNAL DEVICES THAT CAPTURE DATA

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 222 days.

(21) Appl. No.: 14/596,218

(22) Filed: Jan. 14, 2015

(51) Int. Cl.
*G06F 21/45* (2013.01)
*G06F 21/31* (2013.01)
*H04L 29/06* (2006.01)

(52) U.S. Cl.
CPC .............. *G06F 21/45* (2013.01); *G06F 21/31* (2013.01); *H04L 63/0838* (2013.01)

(58) Field of Classification Search
CPC ....................................................... G06F 21/31
See application file for complete search history.

(56) References Cited

U.S. PATENT DOCUMENTS

| | | | |
|---|---|---|---|
| 5,303,378 A | 4/1994 | Cohen | |
| 5,321,735 A | 6/1994 | Breeden et al. | |
| 5,764,889 A | 6/1998 | Ault et al. | |
| 5,796,952 A | 8/1998 | Davis et al. | |
| 5,825,876 A | 10/1998 | Peterson, Jr. | |
| 6,131,024 A | 10/2000 | Boltz | |
| 6,177,860 B1 | 1/2001 | Cromer et al. | |

(Continued)

FOREIGN PATENT DOCUMENTS

| FR | EP 1933252 | * | 6/2008 | ............. G06F 21/20 |
|---|---|---|---|---|
| WO | WO2011025433 A1 | | 3/2011 | |

(Continued)

OTHER PUBLICATIONS

Safa Hamdare, Securing SMS based one time password technique from Man in the middle attack, May 2014.*

(Continued)

*Primary Examiner* — Kambiz Zand
*Assistant Examiner* — Thanh Le

(57) ABSTRACT

A user equipment. The user equipment comprises a processor, a memory, a trusted security zone, wherein the trusted security zone provides hardware assisted trust, a ticket generator stored in the trusted security zone to generate a plurality of access codes, and a code generator stored in the trusted security zone. The code generator generates a different one-time-password for each of the plurality of access codes, wherein the one-time-password is not displayed on the user equipment, stores the one-time-password in the trusted security zone, and transmits the one-time-password to a trusted server through a trusted channel. Responsive to an associated access code from the plurality of access codes being displayed and upon request of a user of the user equipment, the code generator displays the one-time-password and invalidates the one-time-password promptly after the display ends.

20 Claims, 7 Drawing Sheets

(56) References Cited

U.S. PATENT DOCUMENTS

| | | |
|---|---|---|
| 6,219,712 B1 | 4/2001 | Mann et al. |
| 6,222,463 B1 | 4/2001 | Rai |
| 6,363,150 B1 | 3/2002 | Bhagavath et al. |
| 6,389,403 B1 | 5/2002 | Dorak, Jr. |
| 6,434,561 B1 | 8/2002 | Durst, Jr. et al. |
| 6,477,180 B1 | 11/2002 | Aggarwal et al. |
| 6,507,869 B1 | 1/2003 | Franke et al. |
| 6,507,904 B1 | 1/2003 | Ellison et al. |
| 6,614,893 B1 | 9/2003 | Paiz |
| 6,651,171 B1 | 11/2003 | England et al. |
| 6,668,322 B1 | 12/2003 | Wood et al. |
| 6,691,230 B1 | 2/2004 | Bardon |
| 6,754,784 B1 | 6/2004 | North et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 7,043,241 B1 | 5/2006 | Sladek et al. |
| 7,069,234 B1 | 6/2006 | Cornelius et al. |
| 7,127,541 B2 | 10/2006 | Govindarajulu et al. |
| 7,366,806 B2 | 4/2008 | Milenkovic et al. |
| 7,386,275 B2 | 6/2008 | Pirzada et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,574,382 B1 | 8/2009 | Hubert |
| 7,650,645 B1 | 1/2010 | Langendorf et al. |
| 7,716,720 B1 | 5/2010 | Marek et al. |
| 7,761,558 B1 | 7/2010 | Jindal et al. |
| 7,849,309 B1 | 12/2010 | Brown |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,295,811 B1 | 10/2012 | Gailloux et al. |
| 8,298,295 B2 | 10/2012 | Aissi et al. |
| 8,316,237 B1 | 11/2012 | Felsher et al. |
| 8,332,953 B2 | 12/2012 | Lemieux et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,442,588 B2 | 5/2013 | Sims et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,498,572 B1 | 7/2013 | Schooley et al. |
| 8,504,097 B1 | 8/2013 | Cope et al. |
| 8,542,833 B2 | 9/2013 | Devol et al. |
| 8,566,183 B1 | 10/2013 | Bonar et al. |
| 8,588,749 B1 | 11/2013 | Sadhvani et al. |
| 8,590,012 B2 | 11/2013 | Roy et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,650,492 B1 | 2/2014 | Mui et al. |
| 8,661,119 B1 | 2/2014 | Jindal et al. |
| 8,667,607 B2 | 3/2014 | Paczkowski et al. |
| 8,681,969 B1 | 3/2014 | Rodde et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,826,015 B2 | 9/2014 | Lakshminarayanan et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,868,898 B1 | 10/2014 | Van Hoof |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 9,161,227 B1 | 10/2015 | Bye et al. |
| 9,161,325 B1 | 10/2015 | Urbanek |
| 9,171,243 B1 | 10/2015 | Cordes et al. |
| 9,177,157 B2 | 11/2015 | Binder |
| 9,183,412 B2 | 11/2015 | Bye et al. |
| 9,183,606 B1 | 11/2015 | Paczkowski et al. |
| 9,185,626 B1 | 11/2015 | Kunkel et al. |
| 9,191,388 B1 | 11/2015 | Paczkowski et al. |
| 9,191,522 B1 | 11/2015 | Krieger et al. |
| 9,208,339 B1 | 12/2015 | Paczkowski et al. |
| 9,210,576 B1 | 12/2015 | Cope et al. |
| 9,215,180 B1 | 12/2015 | Bertz et al. |
| 9,226,145 B1 | 12/2015 | Loman et al. |
| 9,230,085 B1 | 1/2016 | Paczkowski et al. |
| 9,253,589 B2 | 2/2016 | McCann et al. |
| 9,268,959 B2 | 2/2016 | Paczkowski et al. |
| 9,282,898 B2 | 3/2016 | McRoberts et al. |
| 9,324,016 B1 | 4/2016 | Cordes et al. |
| 9,374,363 B1 | 6/2016 | Paczkowski et al. |
| 9,384,498 B1 | 7/2016 | Bertz et al. |
| 9,443,088 B1 | 9/2016 | Bye et al. |
| 9,454,723 B1 | 9/2016 | Cordes et al. |
| 9,473,945 B1 | 10/2016 | Marquardt et al. |
| 9,560,519 B1 | 1/2017 | McCracken, Jr. et al. |
| 9,613,208 B1 | 4/2017 | Paczkowski et al. |
| 9,712,999 B1 | 7/2017 | Cordes et al. |
| 2001/0041591 A1 | 11/2001 | Carroll |
| 2002/0002468 A1 | 1/2002 | Spagna et al. |
| 2002/0007456 A1 | 1/2002 | Peinado et al. |
| 2002/0035697 A1 | 3/2002 | McCurdy et al. |
| 2002/0091569 A1 | 7/2002 | Kitaura et al. |
| 2002/0095389 A1 | 7/2002 | Gaines et al. |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0092435 A1 | 5/2003 | Boivin |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0182347 A1 | 9/2003 | Dehlinger |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0036572 A1 | 2/2004 | Forster |
| 2004/0043788 A1 | 3/2004 | Mittal |
| 2004/0064351 A1 | 4/2004 | Mikurak |
| 2004/0093274 A1 | 5/2004 | Vanska et al. |
| 2004/0137890 A1 | 7/2004 | Kalke |

(56) References Cited

U.S. PATENT DOCUMENTS

| | | |
|---|---|---|
| 2004/0158840 A1 | 8/2004 | Rothman et al. |
| 2004/0202319 A1 | 10/2004 | Hussain et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2004/0264372 A1 | 12/2004 | Huang |
| 2005/0015601 A1 | 1/2005 | Tabi |
| 2005/0044375 A1 | 2/2005 | Paatero et al. |
| 2005/0045719 A1 | 3/2005 | Yang |
| 2005/0052994 A1 | 3/2005 | Lee |
| 2005/0091505 A1 | 4/2005 | Riley et al. |
| 2005/0107068 A1 | 5/2005 | Smith et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0145688 A1 | 7/2005 | Milenkovic et al. |
| 2005/0153741 A1 | 7/2005 | Chen et al. |
| 2005/0164680 A1 | 7/2005 | Gould |
| 2005/0181796 A1 | 8/2005 | Kumar et al. |
| 2005/0200478 A1 | 9/2005 | Koch et al. |
| 2005/0226468 A1 | 10/2005 | Deshpande et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0258250 A1 | 11/2005 | Melick et al. |
| 2005/0272445 A1 | 12/2005 | Zellner |
| 2005/0280557 A1 | 12/2005 | Jha et al. |
| 2005/0283660 A1 | 12/2005 | McKeen et al. |
| 2005/0289355 A1 | 12/2005 | Kitariev et al. |
| 2006/0008256 A1 | 1/2006 | Khedouri et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0053283 A1 | 3/2006 | Feinleib et al. |
| 2006/0074544 A1 | 4/2006 | Morariu et al. |
| 2006/0129488 A1 | 6/2006 | Vincent |
| 2006/0156026 A1 | 7/2006 | Utin |
| 2006/0161626 A1 | 7/2006 | Cardina et al. |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0239131 A1 | 10/2006 | Nathan et al. |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0006175 A1 | 1/2007 | Durham et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0061570 A1 | 3/2007 | Holtzman et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro |
| 2007/0143210 A1 | 6/2007 | Yeung et al. |
| 2007/0150730 A1 | 6/2007 | Conti |
| 2007/0156850 A1 | 7/2007 | Corrion |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0188306 A1 | 8/2007 | Tethrake et al. |
| 2007/0192652 A1 | 8/2007 | Kao et al. |
| 2007/0197261 A1 | 8/2007 | Humbel |
| 2007/0214332 A1 | 9/2007 | Sonoda et al. |
| 2007/0226389 A1 | 9/2007 | Poortman |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0011825 A1 | 1/2008 | Giordano et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0034231 A1 | 2/2008 | Ginter et al. |
| 2008/0051142 A1 | 2/2008 | Calvet et al. |
| 2008/0068166 A1 | 3/2008 | Lauper et al. |
| 2008/0089517 A1 | 4/2008 | Bianco et al. |
| 2008/0092213 A1 | 4/2008 | Wei et al. |
| 2008/0097793 A1 | 4/2008 | Dicks et al. |
| 2008/0100419 A1 | 5/2008 | Jatschka et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky et al. |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2008/0271163 A1 | 10/2008 | Stillerman et al. |
| 2008/0281953 A1 | 11/2008 | Blaisdell |
| 2008/0304640 A1 | 12/2008 | Reilly |
| 2009/0047923 A1 | 2/2009 | Jain et al. |
| 2009/0049220 A1 | 2/2009 | Conti et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0132381 A1 | 5/2009 | Gangi |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1 | 8/2009 | Anand et al. |
| 2009/0215385 A1 | 8/2009 | Waters et al. |
| 2009/0224919 A1 | 9/2009 | Angell et al. |
| 2009/0227290 A1 | 9/2009 | Chien |
| 2009/0248445 A1 | 10/2009 | Harnick |
| 2009/0271321 A1 | 10/2009 | Stafford |
| 2009/0275364 A1 | 11/2009 | Morel et al. |
| 2009/0281947 A1 | 11/2009 | Erel |
| 2009/0289764 A1 | 11/2009 | Chiu |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2009/0320048 A1 | 12/2009 | Watt et al. |
| 2010/0031325 A1 | 2/2010 | Maigne et al. |
| 2010/0052844 A1 | 3/2010 | Wesby |
| 2010/0064341 A1 | 3/2010 | Aldera |
| 2010/0066486 A1 | 3/2010 | Park et al. |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0121156 A1 | 5/2010 | Yoo |
| 2010/0125512 A1 | 5/2010 | Jones et al. |
| 2010/0125904 A1 | 5/2010 | Nice et al. |

(56) References Cited

U.S. PATENT DOCUMENTS

| | | |
|---|---|---|
| 2010/0127868 A1 | 5/2010 | Hamilton, II et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153513 A1 | 6/2010 | Zahran |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1* | 10/2010 | Tohmo .............. H04L 9/0863 726/6 |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0078760 A1 | 3/2011 | De Perthuis |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | Voba et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0218849 A1 | 9/2011 | Rutigliano et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258443 A1 | 10/2011 | Barry |
| 2011/0258462 A1 | 10/2011 | Robertson et al. |
| 2011/0269456 A1 | 11/2011 | Krishnaswamy et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0079100 A1 | 3/2012 | McIntyre et al. |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0108295 A1 | 5/2012 | Schell et al. |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137101 A1 | 5/2012 | Arcese et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0218084 A1 | 8/2012 | Arponen et al. |
| 2012/0220269 A1 | 8/2012 | Feng |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0274444 A1 | 11/2012 | Micali et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0010641 A1 | 1/2013 | Dinan |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0086695 A1 | 4/2013 | Lakshminarayanan |
| 2013/0097302 A9 | 4/2013 | Khedouri et al. |
| 2013/0097657 A1 | 4/2013 | Cardamore et al. |

(56) References Cited

U.S. PATENT DOCUMENTS

| | | |
|---|---|---|
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0144663 A1 | 6/2013 | Qawami et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0260791 A1 | 10/2013 | Malinovskiy et al. |
| 2013/0262264 A1 | 10/2013 | Karstoft |
| 2013/0263212 A1 | 10/2013 | Faltyn et al. |
| 2013/0290359 A1 | 10/2013 | Eronen et al. |
| 2013/0290709 A1 | 10/2013 | Muppidi et al. |
| 2013/0305333 A1 | 11/2013 | Katzer et al. |
| 2013/0310003 A1 | 11/2013 | Sadhvani Rita et al. |
| 2013/0313314 A1* | 11/2013 | Jeng .................. G06K 5/00 235/375 |
| 2013/0331067 A1 | 12/2013 | Coussemaeker et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0047548 A1 | 2/2014 | Bye et al. |
| 2014/0052562 A1 | 2/2014 | Oliveira et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0143826 A1 | 5/2014 | Sharp et al. |
| 2014/0155025 A1 | 6/2014 | Parker et al. |
| 2014/0166745 A1 | 6/2014 | Graef et al. |
| 2014/0173747 A1 | 6/2014 | Govindaraju |
| 2014/0188412 A1 | 7/2014 | Mahajan et al. |
| 2014/0188738 A1 | 7/2014 | Huxham |
| 2014/0200051 A1 | 7/2014 | Liu |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279523 A1 | 9/2014 | Lynam et al. |
| 2014/0279556 A1* | 9/2014 | Priebatsch ........... G06Q 20/322 705/67 |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |
| 2015/0032976 A1 | 1/2015 | Chapier et al. |
| 2015/0106805 A1 | 4/2015 | Melander et al. |
| 2015/0169885 A1 | 6/2015 | Paczkowski et al. |
| 2015/0172928 A1 | 6/2015 | Katzer et al. |
| 2015/0358455 A1 | 12/2015 | Mosher et al. |
| 2016/0004876 A1 | 1/2016 | Bye et al. |
| 2016/0142396 A1 | 5/2016 | Mcroberts et al. |
| 2017/0026840 A1 | 1/2017 | Eyal |

FOREIGN PATENT DOCUMENTS

| | | |
|---|---|---|
| WO | WO2012064171 A1 | 5/2012 |
| WO | WO2012085593 A1 | 6/2012 |
| WO | WO2013170228 A2 | 11/2013 |
| WO | WO2014004590 A2 | 1/2014 |
| WO | WO2014018575 A2 | 1/2014 |
| WO | WO2014025687 A2 | 2/2014 |
| WO | WO2014158431 A1 | 10/2014 |

OTHER PUBLICATIONS

FAIPP Pre-Interview Communication dated Mar. 20, 2014, U.S. Appl. No. 13/482,731, filed May 29, 2012.

Notice of Allowance dated May 27, 2014, U.S. Appl. No. 13/482,731, filed May 29, 2012.

FAIPP Pre-Interview Communication dated Oct. 24, 2012, U.S. Appl. No. 13/463,797, filed May 3, 2012.

Notice of Allowance dated Mar. 1, 2013, U.S. Appl. No. 13/463,797, filed May 3, 2012.

FAIPP Pre-Interview Communication dated Jun. 12, 2013, U.S. Appl. No. 13/440,980, filed Apr. 5, 2012.

Final Office Action dated Sep. 9, 2013, U.S. Appl. No. 13/440,980, filed Apr. 5, 2012.

Notice of Allowance dated Nov. 29, 2013, U.S. Appl. No. 13/440,980, filed Apr. 5, 2012.

FAIPP Pre-Interview Communication dated Oct. 24, 2012, U.S. Appl. No. 13/463,801, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

Final Office Action dated Mar. 27, 2014, U.S. Appl. No. 13/470,203, filed May 11, 2012.

Advisory Action dated May 29, 2014, U.S. Appl. No. 13/470,203, filed May 11, 2012.

Office Action dated Aug. 29, 2014, U.S. Appl. No. 13/470,203, filed May 11, 2012.

Notice of Allowance dated Dec. 22, 2014, U.S. Appl. No. 13/470,203, filed May 11, 2012.

FAIPP Pre-Interview Communication dated May 12, 2014, U.S. Appl. No. 13/294,177, filed Nov. 11, 2011.

Notice of Allowance dated Oct. 8, 2014, U.S. Appl. No. 13/294,177, filed Nov. 11, 2011.

FAIPP Pre-Interview Communication dated Sep. 25, 2014, U.S. Appl. No. 13/533,969, filed Jun. 27, 2012.

Notice of Allowance dated Feb. 5, 2015, U.S. Appl. No. 13/533,969, filed Jun. 27, 2012.

FAIPP Pre-Interview Communication dated Jun. 6, 2013, U.S. Appl. No. 13/571,348, filed Aug. 10, 2012.

Office Action dated Sep. 25, 2013, U.S. Appl. No. 13/571,348, filed Aug. 10, 2012.

Final Office Action dated Apr. 10, 2014, U.S. Appl. No. 13/571,348, filed Aug. 10, 2012.

Advisory Action dated Jun. 23, 2014, U.S. Appl. No. 13/571,348, filed Aug. 10, 2012.

Office Action dated Dec. 15, 2014, U.S. Appl. No. 13/571,348, filed Aug. 10, 2012.

Restriction Requirement dated Jan. 2, 2015, U.S. Appl. No. 13/762,319, filed Feb. 7, 2013.

Notice of Allowance dated Aug. 30, 2013; U.S. Appl. No. 13/540,437, filed Jul. 2, 2012.

Restriction Requirement dated Nov. 1, 2013, U.S. Appl. No. 13/557,213, filed Jul. 25, 2012.

Office Action dated Dec. 19, 2013, U.S. Appl. No. 13/557,213, filed Jul. 25, 2012.

Notice of Allowance dated Jun. 4, 2014, U.S. Appl. No. 13/557,213, filed Jul. 25, 2012.

FAIPP Pre-Interview Communication dated Nov. 27, 2013, U.S. Appl. No. 13/610,856, filed Sep. 11, 2012.

Notice of Allowance date Jan. 31, 2014, U.S. Appl. No. 13/610,856, filed Sep. 11, 2012.

(56) References Cited

OTHER PUBLICATIONS

FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
FAIPP Pre-Interview Communication dated Aug. 4, 2014, U.S. Appl. No. 13/844,357, filed Mar. 15, 2013.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
FAIPP Pre-Interview Communication dated Feb. 12, 2015, U.S. Appl. No. 14/066,661, filed Oct. 29, 2013.
Restriction Requirement dated Aug. 14, 2014, U.S. Appl. No. 13/594,777, filed Aug. 25, 2012.
Notice of Allowance dated Dec. 3, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
Notice of Allowance dated Sep. 19, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
First Action Interview Office Action dated Dec. 3, 2014, U.S. Appl. No. 13/594,779, filed Aug. 25, 2012.
Office Action dated May 5, 2014, U.S. Appl. No. 13/786,450, filed Mar. 5, 2013.
Final Office Action dated Nov. 7, 2014, U.S. Appl. No. 13/786,450, filed Mar. 5, 2013.
Notice of Allowance dated Feb. 26, 2015, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 24, 2015, U.S. Appl. No. 14/163,047, filed Jan. 24, 2014.
Restriction Requirement dated Jan. 5, 2015, U.S. Appl. No. 13/857,139, filed Apr. 4, 2013.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Foreign Communication from a Related Counterpart—International Preliminary Report on Patentability, dated Nov. 20, 2014, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Search Report and Written Opinion, dated Apr. 22, 2014, PCT/US13/53617, filed on Aug. 5, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Preliminary Report on Patentability, dated Feb. 5, 2015, PCT/US13/51750, filed on Jul. 24, 2013.
Foreign Communication from a Related Counterpart—International Search Report and Written Opinion, dated Jul. 11, 2014, PCT/US14/16651, filed on Feb. 16, 2014.
Ahmed, Farid, et al., "Correlation-based Watermarking Method for Imagine Authentication Applications", Society of Photo-Optical Instrumentation Engineers, Feb. 17, 2004, pp. 1834-1838.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee. org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore. ieee. org/stamp/stamp.jsp?tp=&arnumber= 1617569.
Katzer, Robin D., et al., "Secure Placement of Centralized Media Controller Application in Mobile Access Terminal", filed Nov. 11, 2011, U.S. Appl. No. 13/294,177.
Paczkowski, Lyle W., et al., "Trusted Policy and Charging Enforcement Function", filed Jun. 27, 2012, U.S. Appl. No. 13/533,969.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Access to Peripheral Devices", filed Jan. 6, 2014, U.S. Appl. No. 14/148,714.

(56) References Cited

OTHER PUBLICATIONS

Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013 U.S. Appl. No. 13/802,404.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Trusted Processing Location Within a Graphics Processing Unit", filed Jul. 10, 2013, U.S. Appl. No. 13/939,175.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Verifying Applications Using a Trusted Security Zone", filed Aug. 12, 2013, U.S. Appl. No. 13/964,112.
Bye, Stephen James, et al., "Delivering Digital Content to a Mobile Device via a Digital Rights Clearing House", filed Apr. 10, 2013, U.S. Appl. No. 13/860,338.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed on Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Cordes, Kevin R., et al., "Digest of Biographical Information for an Electronic Device with Static and Dynamic Portions", filed on Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed on Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed on Apr. 4, 2013, U.S. Appl. No. 13/857,138.
Advisory Action dated Jan. 29, 2016, U.S. Appl. No. 14/632,850, filed Feb. 26, 2015.
FAIPP Pre-Interview Communication dated Mar. 1, 2016, U.S. Appl. No. 13/863,376, filed Apr. 15, 2013.
Notice of Allowance dated Feb. 26, 2016, U.S. Appl. No. 13/844,282, filed Mar. 15, 2013.
Restriction Requirement dated Jan. 12, 2016, U.S. Appl. No. 13/912,190, filed Jun. 6, 2013.
FAIPP Pre-Interview Communication dated Mar. 11, 2016, U.S. Appl. No. 13/912,190, filed Jun. 6, 2013.
Notice of Allowance dated Dec. 17, 2015, U.S. Appl. No. 13/857,141, filed Apr. 4, 2013.
Dietrich, Kurt, et al., "Implementation Aspects of Mobile and Embedded Trusted Computing," Institute for Applied Information Processing and Communications, Trusted Computing Interaction Conference, 2009.
McRoberts, Leo Michael, et al., "End-to-End Trusted Communications Infrastructure," filed Jan. 25, 2016, U.S. Appl. No. 15/005,123.
Cordes, Kevin R., et al., "Digest of Biographical Information for an Electronic Device with Static and Dynamic Portions," filed on Mar. 14, 2016, U.S. Appl. No. 15/069,921.
European Examination Report dated Mar. 3, 2016, EPC Application Serial No. , filed on.
Notice of Allowance dated May 2, 2016, U.S. Appl. No. 13/863,376, filed Apr. 15, 2013.
Office Action dated May 17, 2016, U.S. Appl. No. 13/802,404, filed Mar. 13, 2013.
First Action Interview Office Action dated Mar. 28, 2016, U.S. Appl. No. 14/681,077, filed Apr. 7, 2015.
Notice of Allowance dated Mar. 26, 2016, U.S. Appl. No. 13/857,139, filed Apr. 4, 2013.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
FAIPP Pre-Interview Communication dated Mar. 26, 2015, U.S. Appl. No. 13/939,175, filed Jul. 10, 2013.
Final Office Action dated Mar. 24, 2015, U.S. Appl. No. 13/844,282, filed Mar. 15, 2013.
FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.

(56) References Cited

OTHER PUBLICATIONS

Notice of Allowance dated May 29, 2015, U.S. Appl. No. 14/085,474, filed Nov. 20, 2013.
FAIPP Pre-Interview Communication dated Jul. 2, 2015, U.S. Appl. No. 14/632,850, filed Feb. 26, 2015.
Notice of Allowance dated Jun. 17, 2015, U.S. Appl. No. 13/571,348, filed Aug. 10, 2012.
Notice of Allowance dated Jun. 9, 2015, U.S. Appl. No. 13/762,319, filed Feb. 7, 2013.
Notice of Allowance dated Aug. 4, 2015, U.S. Appl. No. 14/090,667, filed Nov. 26, 2013.
Notice of Allowance dated Jul. 6, 2015, U.S. Appl. No. 13/844,145, filed Mar. 15, 2013.
Notice of Allowance dated Jul. 6, 2015, U.S. Appl. No. 14/066,661, filed Oct. 29, 2013.
Notice of Allowance dated Aug. 14, 2015, U.S. Appl. No. 13/594,779, filed Aug. 25, 2012.
Final Office Action dated Aug. 27, 2015, U.S. Appl. No. 13/802,404, filed Mar. 13, 2013.
Notice of Allowance dated Jul. 7, 2015, U.S. Appl. No. 13/939,175, filed Jul. 10, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Aug. 3, 2015, U.S. Appl. No. 13/964,112, filed Aug. 12, 2013.
Notice of Allowance dated Jul. 1, 2015, U.S. Appl. No. 14/075,663, filed Nov. 8, 2013.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139, filed Apr. 4, 2013.
Notice of Allowance dated Jun. 11, 2015, U.S. Appl. No. 13/857,138, filed Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.
Final Office Action dated Nov. 6, 2015, U.S. Appl. No. 14/632,850, filed Feb. 26, 2015.
FAIPP Office Action Sep. 15, 2015, U.S. Appl. No. 13/532,588, filed Jun. 25, 2012.
Notice of Allowance dated Nov. 5, 2015, U.S. Appl. No. 13/532,588, filed Jun. 25, 2012.
Supplemental Notice of Allowance dated Nov. 16, 2015, U.S. Appl. No. 13/532,588, filed Jun. 25, 2012.
Notice of Allowance dated Sep. 21, 2015, U.S. Appl. No. 14/148,714, filed Jan. 6, 2014.
Notice of Allowance dated Nov. 9, 2015, U.S. Appl. No. 14/659,614, filed Mar. 17, 2015.
Advisory Action dated Nov. 16, 2015, U.S. Appl. No. 13/802,404, filed Mar. 13, 2013.
FAIPP Pre-Interview Communication dated Nov. 18, 2015, U.S. Appl. No. 14/681,077, filed Apr. 7, 2015.
Office Action dated Nov. 19, 2015, U.S. Appl. No. 13/857,139, filed Apr. 4, 2013.
Foreign Communication from a Related Counterpar—International Preliminary Report on Patentability, dated Sep. 24, 2015, PCT/US14/16651, filed on Feb. 16, 2014.
Bye, Stephen James, et al., "Systems and Methods for Provisioning and Using Multiple Trusted Security Zones on an Electronic Device," filed Sep. 15, 2015, U.S. Appl. No. 14/855,364.
FAIPP Pre-Interview Communication dated Mar. 21, 2017, U.S. Appl. No. 14/855,364, filed Sep. 15, 2015.
European Examination Report dated Feb. 14, 2017, EPC Application Serial No. 14775613.4, filed on Jul. 8, 2015.
Final Office Action dated Mar. 9, 2017, U.S. Appl. No. 13/860,338, filed Apr. 10, 2013.
Office Action dated Mar. 8, 2017, U.S. Appl. No. 14/947,257, filed Nov. 20, 2015.
Notice of Allowance dated Mar. 10, 2017, U.S. Appl. No. 15/069,921, filed Mar. 14, 2016.
Paczkowski, Lyle W., et al., "System and Method for Secure USIM Wireless Network Access," filed Nov. 20, 2015, U.S. Appl. No. 14/947,257.
Examiner's Answer dated Nov. 16, 2016, U.S. Appl. No. 14/632,850, filed Feb. 26, 2015.
Notice of Allowance dated Nov. 18, 2016, U.S. Appl. No. 13/802,404, filed Mar. 13, 2013.
FAIPP Pre-Interview Communication dated Oct. 5, 2016, U.S. Appl. No. 15/069,921, filed Mar. 14, 2016.
McCracken, Billy Gene, Jr., et al. "Mobile Communication Device Profound Identity Brokering Framework", filed Nov. 30, 2016, U.S. Appl. No. 15/365,934.
European Examination Report dated Jun. 1, 2016, EPC Application Serial No. 14775613.4, filed on Jul. 8, 2015.
Office Action dated Aug. 25, 2016, U.S. Appl. No. 13/860,338, filed Apr. 10, 2013.
Notice of Allowance dated Aug. 24, 2016, U.S. Appl. No. 13/912,190, filed Jun. 6, 2013.
Notice of Allowance dated Jun. 15, 2016, U.S. Appl. No. 14/681,077, filed Apr. 7, 2015.
Eastlake, 3rd Motorola labs T Hansen AT&T Labs D: "US Secure Hash Algorithms," MPEG Meeting Mar. 16, 2011 to Mar. 23, 2011, Geneva, XP15047395A, ISSN: 0000-0003. [32602].
Notice of Allowance dated Jul. 6, 2017, U.S. Appl. No. 14/855,364, filed Sep. 15, 2015.
Japanese Decision for Grant dated Jun. 6, 2017, JP Application Serial No. 2015-524404.
Advisory Action dated Jun. 1, 2017, U.S. Appl. No. 13/860,338, filed Apr. 10, 2013.
FAIPP Pre-Interview Communication dated Apr. 27, 2017, U.S. Appl. No. 14/606,011, filed Jan. 26, 2015.
Notice of Allowance dated Jul. 24, 2017, U.S. Appl. No. 14/947,257, filed Nov. 20, 2015.
Twin Connect—"User Guide for Windows"; 30 pages; dated 2013.
wiseGEEK, "What is a USB Dongle?," http://www.wisegeek.com/what-is-a-usb-dongle.htm, four pages, dated Jul. 25, 2017.

* cited by examiner

TRUSTED CODE GENERATION AND VERIFICATION TO PREVENT FRAUD FROM MALEFICENT EXTERNAL DEVICES THAT CAPTURE DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network capable electronic devices are becoming increasingly prevalent in our daily lives. With the rapid development and popularization of network capable electronic devices, applications on the network capable electronic devices are growing rapidly. For example, people can now order, pay for, obtain, and redeem digital tickets on network capable mobile communication devices.

SUMMARY

In an embodiment, a user equipment is disclosed. The user equipment comprises a processor, a memory, a trusted security zone, wherein the trusted security zone provides hardware assisted trust, a ticket generator stored in the trusted security zone to generate a plurality of access codes, and a code generator stored in the trusted security zone. The code generator generates a different one-time-password for each of the plurality of access codes, wherein the one-time-password is not displayed on the user equipment, stores the one-time-password in the trusted security zone, and transmits the one-time-password to a trusted server through a trusted channel. Responsive to an associated access code from the plurality of access codes being displayed and upon request of a user of the user equipment, the code generator further displays the one-time-password and invalidates the one-time-password promptly after the display ends.

In an embodiment, a method of generating and verifying one-time-passwords for user equipments is disclosed. The method comprises generating, by a code generator stored in a trusted security zone in a memory of a user equipment, a different one-time-password associated with each of a plurality of access codes, wherein the trusted security zone provides hardware assisted trust, wherein the one-time-password is not displayed on the user equipment at the time of generation, and storing the one-time-password in the trusted security zone. The method further comprises transmitting the generated one-time-password to a trusted server through a trusted channel, and responsive to an associated access code being displayed at a point of sale (POS), displaying the one-time-password. The method further comprises transmitting, by the POS, a request to the trusted server for a one-time-password associated with the access code, and comparing the one-time-password displayed on the user equipment with the one-time-password received from the trusted server. The method further comprises responsive to the associated access code having been verified and the one-time-passwords matching, granting access associated with the access code to the user equipment, and invalidating the one-time-password promptly after the display ends.

In an embodiment, a method of generating and verifying one-time-passwords for user equipments is disclosed. The method comprises generating, by a code generator stored in a trusted security zone in a memory of a user equipment, a different one-time-password associated with each of a plurality of access codes, wherein the one-time-password is not displayed on the user equipment, and storing the one-time-password in the trusted security zone. The method further comprises transmitting the generated one-time-password to a trusted server through an encrypted channel, and responsive to an associated access code being displayed to a work station, transmitting the one-time-password to the work station through a dedicated channel, wherein the one-time-password is not displayed on the user equipment or the work station. The method further comprises transmitting, by the work station, a request to the trusted server for a one-time-password associated with the access code, comparing the one-time-password received from the user equipment with the one-time-password received from the trusted server, and examining the access code. The method further comprises responsive to the associated access code having been verified and the one-time-passwords from the user equipment and the trusted server matching, granting access associated with the access code to the user equipment, and invalidating the one-time-password after granting access to the user equipment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
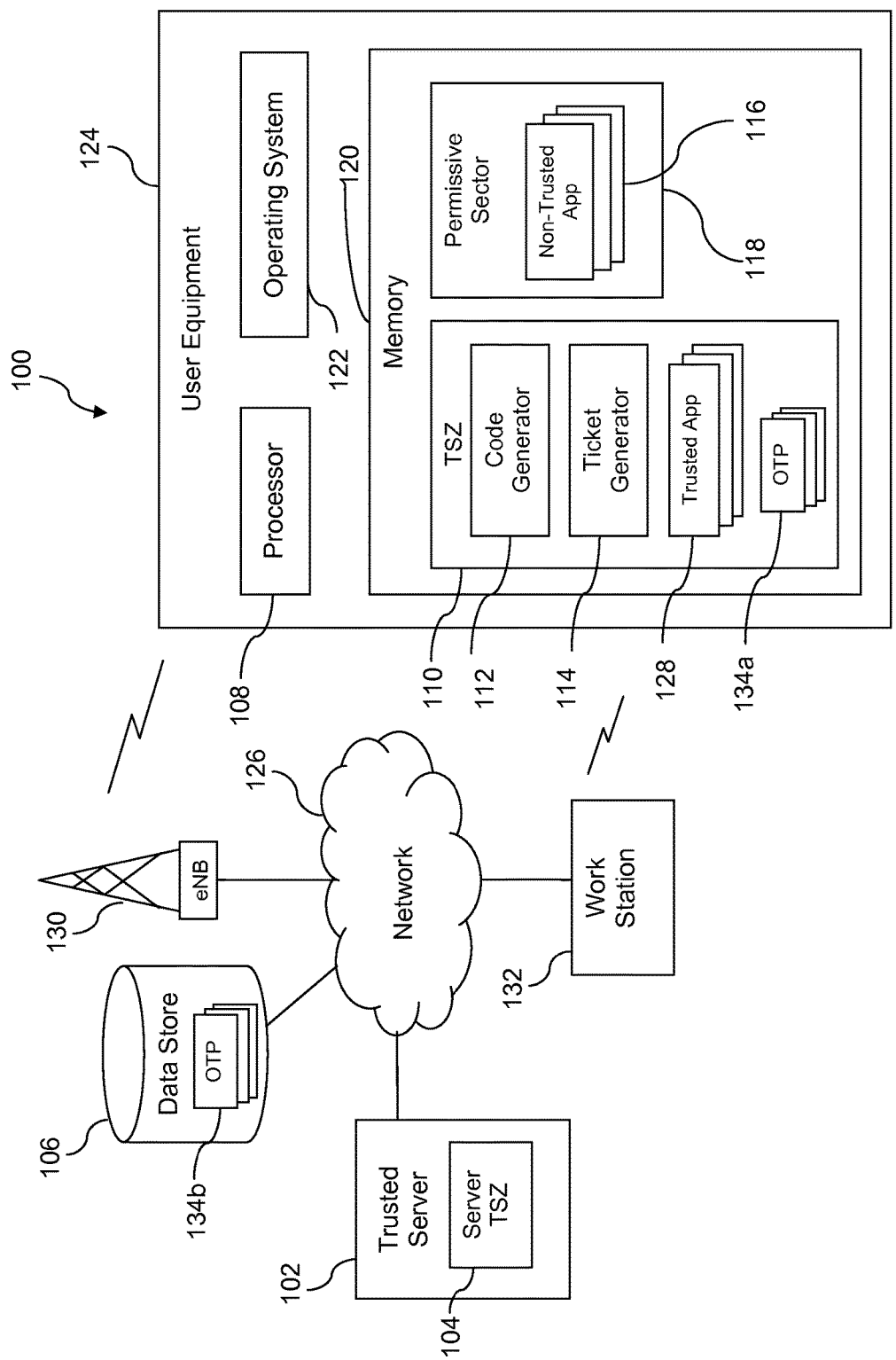
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

User equipments may present digital tickets or e-tickets in a visual manner, for example as a number, a barcode, a quick response (QR) code, or in some other visual manner on a display of the user equipment. E-tickets may be vulnerable to shoulder-surfing with external cameras. For example, someone may take a video or photograph with an external camera of keyboard entry of an e-ticket on a user equipment. Alternatively, the person may use the external camera to capture a screenshot of the user equipment with e-ticket information displayed on the screen of the user equipment. The present disclosure teaches a system and method for generating one-time-passwords to prevent fraud from maleficent external devices that capture data.

For example, a code generator application in a trusted security zone in a memory of a user equipment may generate a one-time-password associated with an access token or an access code when the access code is obtained. The access code may be a flight e-ticket, a sports event e-ticket, a music event e-ticket, a hotel room reservation, secure space access, or another type of access code. For example, in the case where the access code is a flight e-ticket, when the flight e-ticket is purchased and/or generated, the code generator may generate a one-time-password associated with the flight e-ticket. For a second access code, a second one-time-password may be generated by the code generator.

A one-time-password may be generated by the code generator as a random number, for example using a random number generating algorithm or a pseudorandom number generating algorithm. The one-time-password may not be displayed at the time of generation. Furthermore, the one-time-password may not be displayed until the final use of the one-time-password or may not be displayed at all. For example, when a user and/or owner of the user equipment checks the e-ticket on the user equipment, the one-time-password may not be displayed. After the one-time-password is generated, it may be stored in the trusted security zone on the user equipment.

The one-time-password may also be transmitted to a trusted server by the code generator along with the association with the access code in a trusted and/or encrypted channel. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. The trusted server may store the one-time-passwords with the associated access codes, for example on the trusted server itself or in a data store. It should be noted that although a user equipment with a trusted security zone is discussed throughout the disclosure as a preferred embodiment, the technology discussed in this disclosure may also be applied to user equipments without a trusted security zone enablement.

When the access code is displayed to be redeemed, for example when a flight e-ticket is displayed at a boarding counter, the one-time-password may be used. The one-time-password may be displayed or hidden when it is used. For example, the one-time-password may be displayed when the access code is displayed and an access agent (e.g., airline boarding agent) may read the one-time-password and enter it into a work station. Alternatively, the one-time-password may be received or read from the user equipment by the work station at the boarding counter without the one-time-password being displayed when the access code is displayed. For example, the one-time-password may be transmitted by the code generator from the user equipment to the work station using near field communication (NFC), WiFi direct, Bluetooth®, or some other non-visual method. When the work station obtains information of the one-time-password and the access code, the work station may transmit a request to the trusted server in order to verify whether or not the one-time-password is valid.

For example, the work station may request for a one-time-password on record associated with the displayed access code, for example by transmitting a request to the trusted server. The trusted server may locate the associated one-time-password based on the access code received from the work station and transmit the located one-time-password and the access code back to the work station. When the one-time-password from the trusted server and the one-time-password from the user equipment match, the one-time-password from the user equipment is determined by the work station to be valid. Alternatively, the work station may transmit to the trusted server both the access code and the associated one-time-password obtained from the user equipment. The trusted server may locate the associated one-time-password stored in the trusted server itself or in the data store based on the access code and compare the one-time-password received from the work station with the one-time-password on record. When the one-time-password stored by the trusted server and the one-time-password received from the work station match, the one-time-password from the work station (originally from the user equipment) is determined by the trusted server to be valid. The access code may be determined by the work station to be valid or not in traditional way(s) as in existing systems.

When both the access code and the one-time-password received from the user equipment are determined to be valid, access associated with the access code may be granted by the work station to the user equipment. Otherwise, access associated with the access code may be denied to the user equipment. The one-time-password may be invalidated by the code generator after use upon receipt of a command from the trusted server. For example, the one-time-password may be deleted, flagged as invalid, or invalidated in some other manner by the code generator. The trusted server may also invalidate the one-time-password at its side. For example, the trusted server may delete the stored one-time-password, flag the stored one-time-password as invalid, or invalidate the stored one-time-password in some other manner.

Turning now to FIG. 1, a communication system 100 is described. In an embodiment, the communication system 100 comprises a plurality of user equipments 124, a data store 106, and a trusted server 102. The trusted server 102 may comprise a server trusted security zone 104. The user equipment may alternatively be referred to in some contexts as a mobile communication device. The user equipment 124 may comprise a processor 108, an operating system 122, and a memory 120. The memory 120 may comprise a trusted security zone portion 110 and a permissive sector 118. The trusted security zone 110 may comprise a plurality of trusted applications 128, a code generator 112, and a ticket generator 114. The permissive sector 118 may comprise a plurality of non-trusted applications 116. The user equipment 124 may be configured to use a radio transceiver to establish a wireless communication link with an enhanced Node B (eNB) 130, and the eNB 130 may provide communications connectivity of the UE 124 to a network 126. The eNB may alternatively be referred to in some contexts as a base transceiver station (BTS). The trusted server 102 and the data store 106 may also have access to the network 126. The network 126 may comprise any combination of private and public networks.

It is understood that the system 100 may comprise any number of user equipments 124, any number of data stores 106, and any number of eNBs 130. The collectivity of eNBs 130 may be said to comprise a radio access network, in that these eNBs 130 may provide a radio communication link to the user equipments 124 to provide access to the network 126. The radio transceiver of the user equipment 124 may communicate with the eNB 130 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol.

While a user equipment or smart phone is used in a preferred embodiment, the teachings of the present disclosure may also be extended to other mobile communication devices such as a laptop computer, a notebook computer, a tablet computer, a mobile phone, a personal digital assistant (PDA), a media player, a headset computer, a wearable computer, a game console, an Internet digital media streaming device, a television, or another network/communications capable device. In an embodiment, the user equipment 124 may have other components (not shown) such as a near field communication (NFC) radio transceiver, a short range radio transceiver such as a wireless local area network radio transceiver, or other components.

The trusted server 102 and the data store 106 may be server computers. The trusted server 102 and the data store 106 may be located in one computer—for example a server computer, in two different computers—for example, a server computer for the trusted server 102 and another computer for the data store 106, in multiple different computers—for example, multiple server computers for the trusted server 102 and other multiple computers for the data store 106, or in some other combination of computers. When the trusted server 102 and the data store 106 are not located in one computer, the trusted server 102 and the data store 106 may share the same wired or wireless local area network.

Non-trusted applications 116 are normal applications on the user equipment 124. When trusted applications 128 are executed in the trusted security zone 110 of the user equipment 124, peripherals and data of the user equipment 124 may not be accessible to the non-trusted applications 116. The non-trusted applications 116 may be stored in a permissive sector 118 in the memory 120. The permissive sector 118 of the memory 120 is the normal partition in the memory 120. Additionally, non-secure resources may be stored in the permissive sector 118 in the memory 120.

The trusted security zone 110 may be implemented by partitioning both hardware and software resources of the user equipment 124 into two partitions: a secure partition and a normal partition. The secure partition may be implemented by a distinct, separate, or dedicated physical processor, usually the first processor, from the processor by which the normal partition may be implemented, usually the second processor. Alternatively, the secure partition may be implemented by a distinct, separate, or dedicated virtual processor from the virtual processor by which the normal partition may be implemented. A server trusted security zone 104 may be a server-side trusted security zone and may communicate with the trusted security zone 110 and/or applications on the user equipment 124.

The code generator 112 may be a trusted application and may be stored in the trusted security zone 110 of the user equipment 124. When executed by the processor 108, the code generator 112 may perform a variety of functionality associated with one-time-passwords 134. For example, the code generator 112 may generate a one-time-password 134 associated with each of a plurality of access codes. The code generator 112 may store the generated one-time-password 134 and/or transmit the one-time-password 134 to the trusted server 102. The code generator 112 may display the one-time-password 134 under predefined circumstances or may exchange the one-time-password 134 with a ticket verification system. Additionally, the code generator 112 may invalidate the one-time-password 134 after the display or exchange upon request from the trusted server 102.

For example, a one-time-password 134 may be generated by the code generator 112 for each access code. The one-time-password 134 may be generated by the code generator 112 as a random number, a group of characters, or any combination of the two, for example using a random number generating algorithm or a pseudorandom number generating algorithm. The random number generating algorithm may use some seed with a difficult to know value, such as the 16 lowest bits of a counter in the user equipment 124, a global positioning system (GPS) coordinate, or a short sequence of bits from a recently taken photograph. The one-time-password 134 may be generated by the code generator 112 based on a number chosen by the trusted server 102, for example using the number chosen by the trusted server 102 as a random seed for the random number generating algorithm or the pseudorandom number generating algorithm. The one-time-password 134 may be generated by the code generator 112 based on a previously generated one-time-password 134, for example using the previously generated one-time-password 134 as a random seed for the random number generating algorithm or the pseudorandom number generating algorithm. Alternatively, the one-time-password 134 may be generated by the code generator 112 based on time-synchronization between the trusted server 102 and the user equipment 124.

The one-time-password 134 may be integrated by the code generator 112 into a file that constitutes the associated access code, for example in text. For example, if the access code is generated as a barcode, the information of the one-time-password 134 may also be integrated or embedded in the barcode. When the barcode is scanned by a ticket agent under predefined circumstances, for example at a specific point of sale (POS), the scanner may extract information of the associated one-time-password 134. For example, the barcode may comprise information of the one-time-password 134 and the scanner may access the trusted security zone 110 to obtain the one-time-password 134 from the trusted security zone 110, for example through an application programming interface (API).

Alternatively, the one-time-password 134 may be generated by the code generator 112 in a way that the one-time-password 134 is separate from a file that constitutes the associated access code. For example, the one-time-password 134 may be generated in a second file separate from a first file that constitutes the access code. In an embodiment, the second file may be coupled to the first file. In another embodiment, the access code may be in the form of a quick response (QR) code and the QR code may comprise a marker, indicator, or pointer pointing to the one-time-password 134.

A plurality of one-time-passwords 134 may be generated at once or at various times. For example, the plurality of one-time-passwords 134 may be generated by the code generator 112 at the same time and may be used at different times. This method of generating a plurality of one-time-passwords 134 at once and using them at various times may be beneficial when the user equipment 124 does not always have access to the network 126 and may not be able to communicate with the trusted server 102 at times. For example, for a flight e-ticket, two one-time-passwords 134 may be generated by the code generator 112 when the e-ticket is purchased and/or generated. Here the flight e-ticket may be an access code. One of the two one-time-passwords 134 may be used at a transportation security administration (TSA) checkpoint at an airport with the e-ticket and/or an identification (ID) document such as a driver's license or a passport. The other one-time-password 134 may be used at a boarding counter with the flight e-ticket right before boarding. With more than one one-time password generated at once, the user equipment 124 and the trusted server 102 may synchronize to use and/or invalidate the one-time-passwords 134. For example, each one-time-password 134 may be configured to have a time-to-live (TTL) value.

Alternatively, one-time-passwords 134 may be generated by the code generator 112 at various times. For example, a first one-time-password 134 may be generated by the code generator 112 at the time when the flight e-ticket is purchased and/or generated. The first one-time-password 134 may be used at the transportation security administration checkpoint at the airport with the flight e-ticket and/or an identification document. A second one-time-password 134 may be generated at a corresponding boarding counter when the e-ticket is displayed to a ticket agent. The second one-time-password 134 may be used at the boarding counter when the flight e-ticket is displayed to the ticket agent.

The one-time-password 134 may not be displayed on the user equipment 124 at the time of generation. The one-time-password 134 may be stored by the code generator 112 in the trusted security zone 110 after the one-time-password 134 is generated. The generated one-time-password 134 may be transmitted by the code generator 112 with the associated access code to the trusted server 102 through a trusted channel. The trusted server 102 may store the received one-time-password 134 and/or the association with the access code in the trusted server 102. Alternatively, the trusted server 102 may store the received one-time-password 134 and/or the association with the access code in the data store 106.

The one-time-password 134 may be used or redeemed by the code generator 112 under predefined circumstances. The one-time-password 134 may be displayed or may be hidden when the one-time-password 134 is used. For example, when the one-time-password 134 is used, it may be displayed on the user equipment 124 or on a work station 132. The work station 132 may be a ticket verification machine. Alternatively, when the one-time-password 134 is used, it may be hidden, e.g., the one-time-password 134 may not be displayed on the user equipment 124 or the work station 132. Instead, information of the one-time-password 134 may be exchanged between the user equipment 124 and the work station 132. For example, information of the one-time-password 134 stored in the trusted security zone 110 of the user equipment 124 may be integrated in or coupled to the associated access code. When the access code is read by the work station 132, the embedded or coupled information of the one-time-password 134 may be obtained by the work station 132 without a visual representation of the one-time-password 134 being shown. The verification process of the one-time-password 134 is similar with the two cases: when the one-time-password 134 is displayed and when the one-time-password 134 is not displayed.

For example, the one-time-password 134 may be displayed or used by the code generator 112 upon request by an owner and/or a user of the user equipment 124. The one-time-password 134 may be displayed or used by the code generator 112 upon receipt of a code, for example a code that is input by the owner and/or user of the user equipment 124. In an embodiment, this code may be different from the access code. For example, the code may be a personal identification number (PIN) of the user equipment 124. The one-time-password 134 may be displayed or used by the code generator 112 based on a location-based service, for example when the location-based service detects that the user equipment 124 is at a specific POS location. For example, if the access code is a flight e-ticket of American Airlines, an associated one-time-password 134 may be displayed or used by the code generator 112 when the location-based service detects that the user equipment 124 is at an American Airlines boarding counter at a specific airport based on the departure information of the e-ticket.

A work station 132 at the boarding counter may verify the access code and the associated one-time-password 134. For example, the work station 132 may read the access code and the associated one-time-password 134. When the one-time-password 134 is not displayed, the work station 132 may receive information of the one-time-password 134 from the user equipment 124 or read information of the one-time-password 134 from the user equipment 124. The work station 132 may verify the access code in the manner that is performed in currently existing systems. When the access code is verified to be valid, the work station 132 may further transmit a request to the trusted server 102 for a one-time-password 134b associated with the verified access code. For example, the work station 132 may transmit a message to the trusted server 102 with the access code requesting for an associated one-time-password 134b.

The trusted server 102 may look up the associated one-time-password 134b, for example in a stored bank of one-time-password(s) 134b and association with access code(s), based on the access code received from the work station 132. When the stored associated one-time-password 134b is located, the trusted server 102 may transmit the located one-time-password 134b with the access code back to the work station 132. After the located one-time-password 134b is received from the trusted server 102, the work station 132 may compare the one-time-password 134b received from the trusted server 102 with the one-time-password 134a displayed on the user equipment 124. The work station 132 may further compare the one-time-password 134a received from the user equipment 124 with the one-time-password 134b received from the trusted server 102. When the one-time-password 134b received from the trusted server 102 matches the one-time-password 134a from the user equipment 124, the one-time-password 134a from the user equipment 124 is determined by the work station 132 to be valid.

Alternatively, when the access code is verified to be valid, the work station 132 may transmit to the trusted server 102 the displayed access code and the one-time-password 134a read and/or received from the user equipment 124. The trusted server 102 may compare the pair of the one-time-password 134a and the access code received from the work station 132 with stored pair(s) of one-time-password(s) 134b and access code(s) to determine whether or not the one-time-password 134a from the work station 132 is valid. For example, the trusted server 102 may locate a record of the pair of the one-time-password 134b and the associated access code based on the access code received from the work station 132. The trusted server 102 may compare the located one-time-password 134b in the record with the one-time-password 134a received from the work station 132. When the located one-time-password 134b in the record matches the one-time-password 134a received from the work station 132, the one-time-password 134a from the work station 132 which originates from the user equipment 124 is determined by the trusted server 102 to be valid. The trusted server 102 may transmit a message to the work station 132 confirming the validity of the one-time-password 134a from the user equipment 124.

When both the access code and the one-time-password 134a from the user equipment 124 are verified to be valid, access associated with the access code may be granted by the work station 132 to the user equipment 124. Otherwise, access associated with the access code may be denied by the work station 132 to the user equipment 124. For example, if the access code from the user equipment 124 is determined to be invalid, access may be denied by the work station 132 to the user equipment 124. If the access code from the user equipment 124 is determined to be valid but the one-time-password 134a from the user equipment 124 is determined to be invalid, access may be denied by the work station 132 to the user equipment 124.

In an embodiment, the one-time-password 134 may be invalidated promptly after the use, for example within one minute after the user, within 30 seconds after the use, or within another short period of time after the use. The one-time-password 134 may be invalidated after the one-time-password 134 is verified to be valid and the associated access is granted to the user equipment 124. Additionally, the one-time-password 134 may be invalidated when the one-time-password 134 is verified to be invalid and the associated access is denied to the user equipment 124. For example, the trusted server 102 may transmit a command to the user equipment 124, for example to the code generator 112 or some other trusted application 128 in the trusted security zone 110, to invalidate the used one-time-password 134. The command may be received by the user equipment 124 through an application programming interface. The one-time-password 134 may be deleted, flagged as invalid, or invalidated in some other manner. The code generator 112 may transmit an acknowledgement message back to the trusted server 102 after the one-time-password 134 has been invalidated. Additionally, the trusted server 102 may also invalidate the one-time-password 134 stored on the trusted server 102 or the data store 106, for example by deleting the one-time-password 134, flagging the one-time-password 134 as invalid, or invalidating the one-time-password 134 in some other manner.

Figure 2:
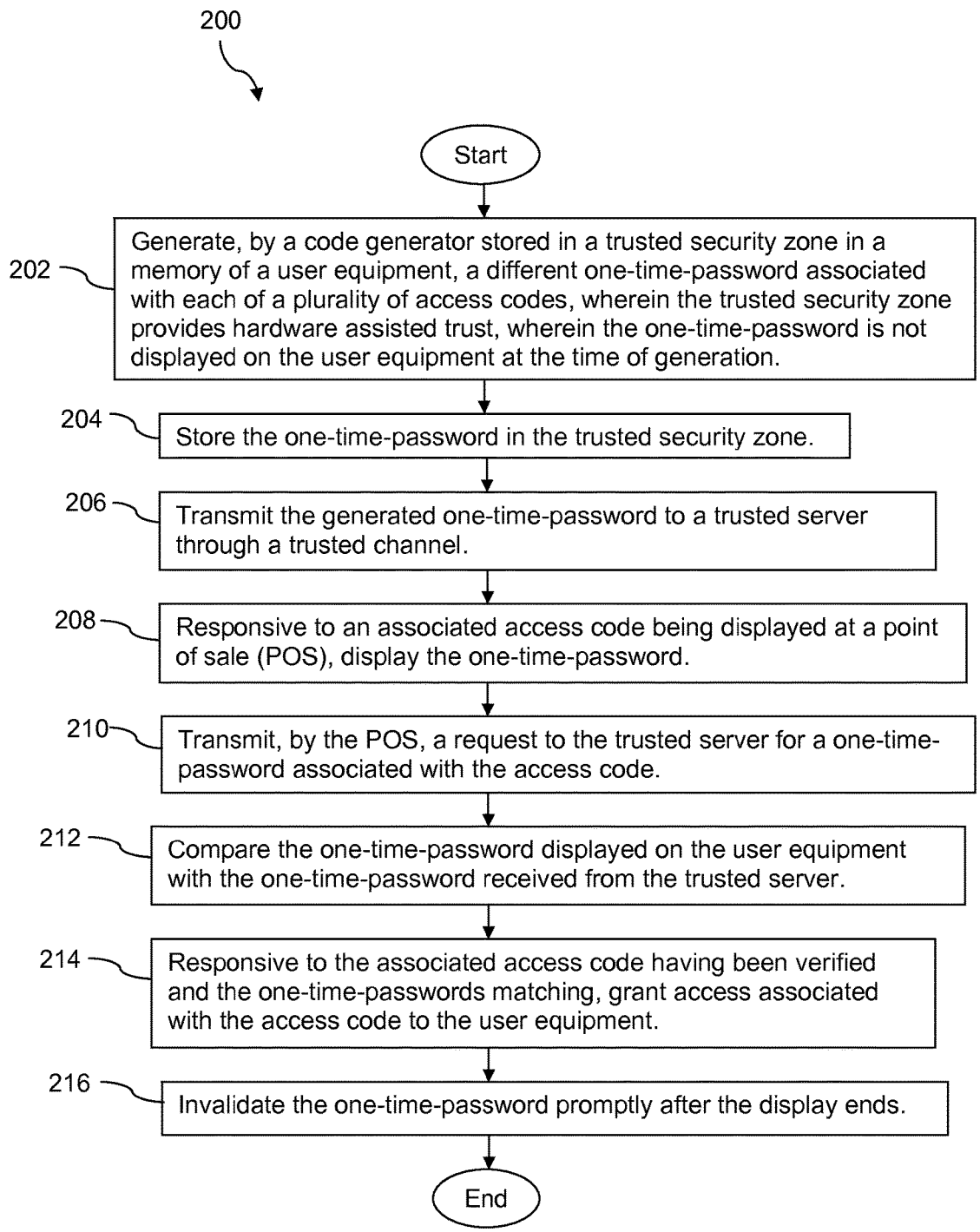
FIG. 2 is a flow chart illustrating a method according to an embodiment of the disclosure.

Turning now to FIG. 2, a method 200 is described. At block 202, a different one-time-password 134 for each of a plurality of access codes is generated by a code generator stored in a trusted security zone in a memory of a user equipment, wherein the trusted security zone provides hardware assisted trust, wherein the one-time-password 134 is not displayed on the user equipment at the time of generation. For example, a different one-time-password 134 associated with each of a plurality of access codes may be generated by the code generator 112 stored in the trusted security zone 110 of the user equipment 124. At block 204, the one-time-password 134 is stored in the trusted security zone 110.

At block 206, the generated one-time-password 134 is transmitted to the trusted server 102 through a trusted channel. At block 208, responsive to an associated access code being displayed at a point of sale (POS), the one-time-password 134a is displayed. At block 210, a request is transmitted by the POS to the trusted server 102 for a one-time-password 134b associated with the access code.

At block 212, the one-time-password 134a displayed on the user equipment 124 is compared with the one-time-password 134b received from the trusted server 102. At block 214, responsive to the associated access code having been verified and the one-time-passwords 134a and 134b matching, access associated with the access code is granted to the user equipment 124. At block 216, the one-time-password 134 is invalidated promptly after the display ends. For example, the one-time-password 134 is deleted from the user equipment 124 and from the trusted server 102.

Figure 3:
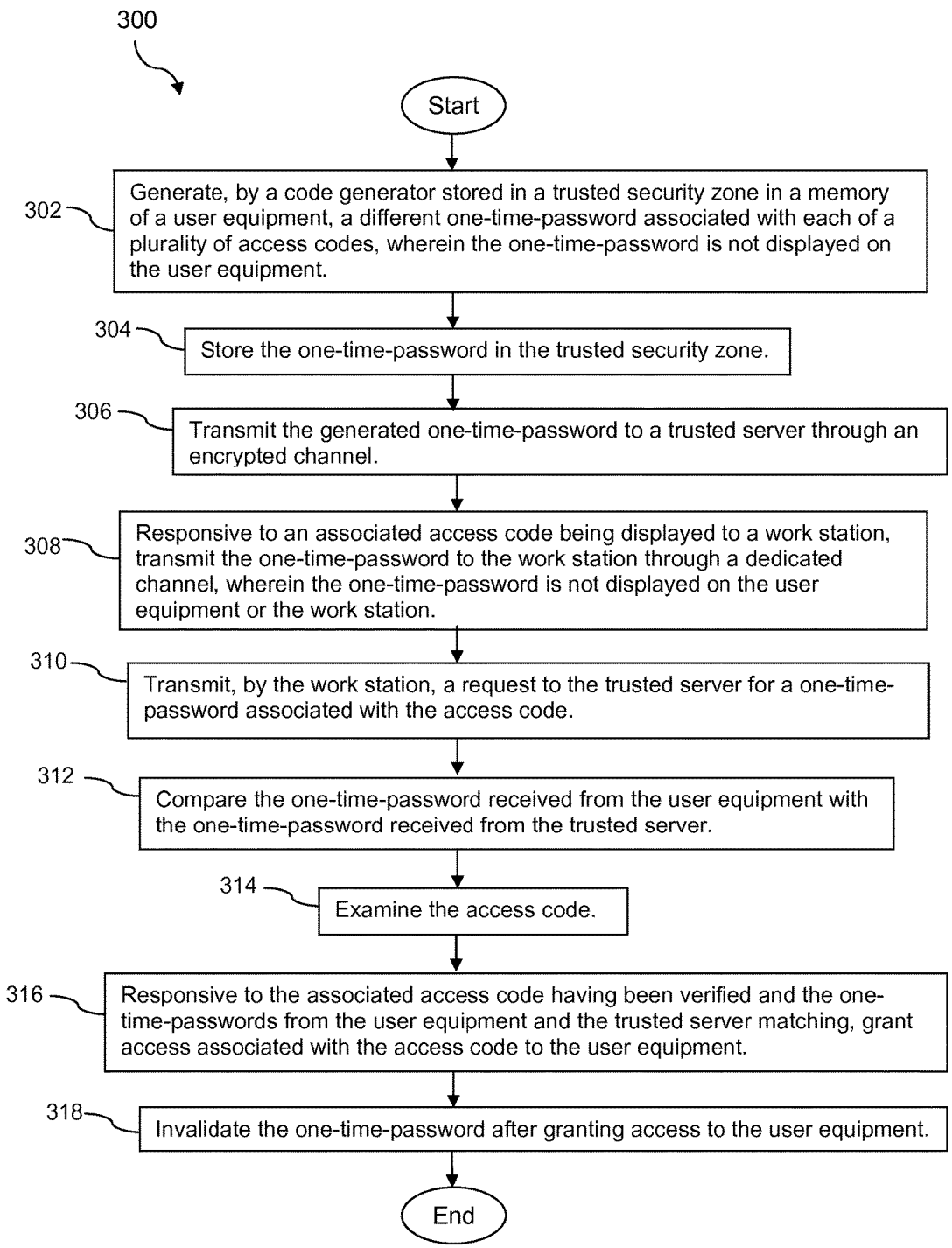
FIG. 3 is a flow chart illustrating another method according to an embodiment of the disclosure.

Turning now to FIG. 3, a method 300 is described. At block 302, a different one-time-password 134 associated with each of a plurality of access codes is generated by the code generator 112 stored in a trusted security zone 110 in a memory 120 of a user equipment 124, wherein the one-time-password 134 is not displayed on the user equipment 124. At block 304, the one-time-password 134 is stored in the trusted security zone 110.

At block 306, the generated one-time-password 134 is transmitted to a trusted server 102 through an encrypted channel. For example, the one-time-password 134 may be encrypted using an encryption key and transmitted over a communication channel to the trusted server 102. Upon receipt of the encrypted one-time-password 134, the trusted server 102 may decrypt the encrypted one-time-password 134 using an appropriate key. At block 308, responsive to an associated access code being displayed to a work station 132, the one-time-password 134a is transmitted to the work station 132 through a dedicated channel, wherein the one-time-password 134a is not displayed on the user equipment 124 or the work station 132. For example, the one-time-password 134a may be transmitted by the code generator 112 from the user equipment 124 to the work station 132 using near field communication (NFC), WiFi direct, Bluetooth®, or some other dedicated channel. At block 310, a request is transmitted by the work station 132 to the trusted server 102 for a one-time-password 134b associated with the access code.

At block 312, the one-time-password 134a received from the user equipment 124 is compared with the one-time-password 134b received from the trusted server 102. At block 314, the access code is examined. At block 316, responsive to the associated access code having been verified and the one-time-passwords 134a and 134b from the user equipment 124 and the trusted server 102 respectively matching, access associated with the access code is granted to the user equipment 124. At block 318, the one-time-password 134 is invalidated after granting access to the user equipment 124.

Figure 4:
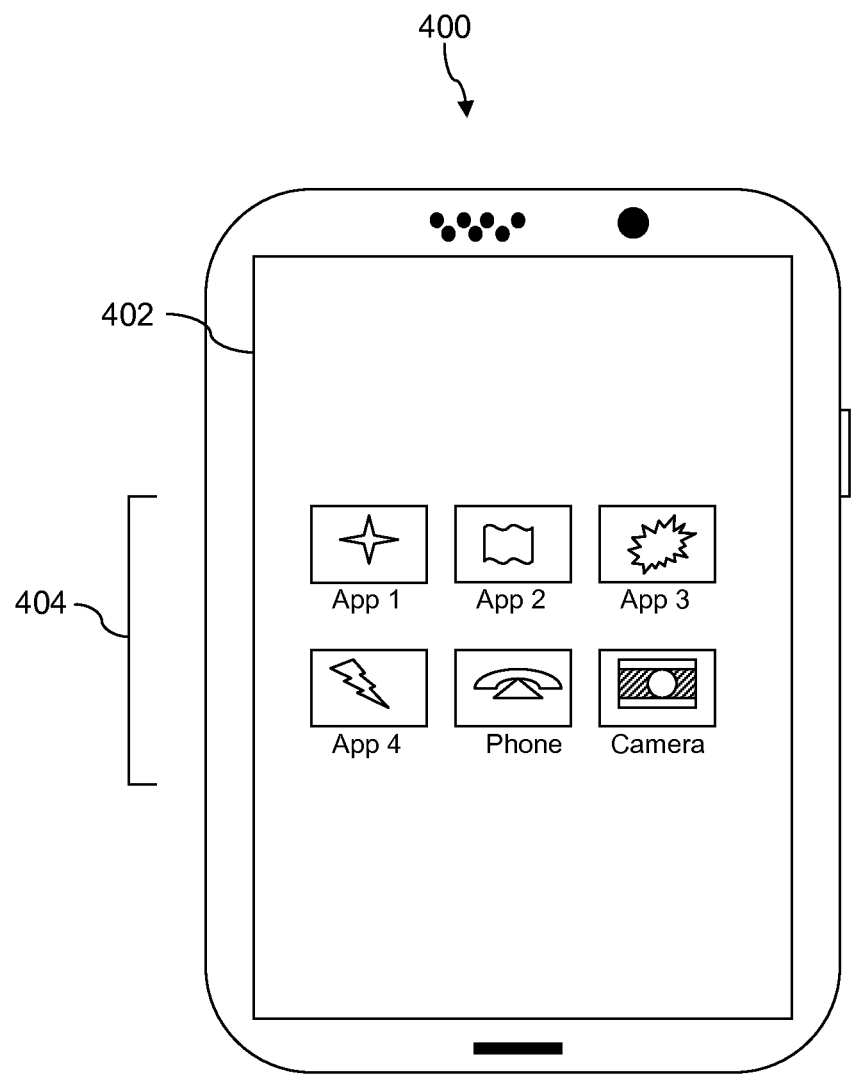
FIG. 4 is an illustration of a user equipment to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
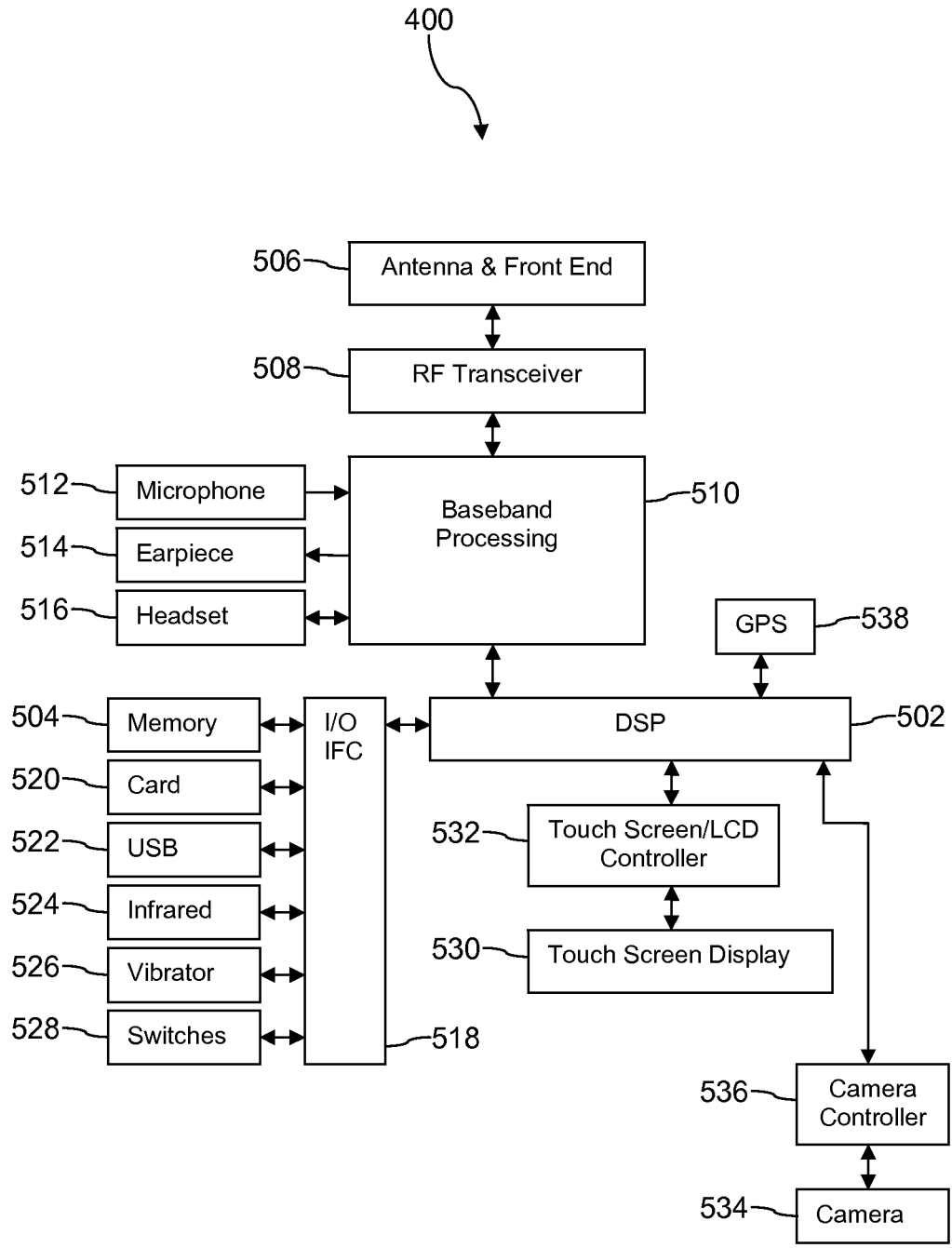
FIG. 5 is a block diagram of a user equipment according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
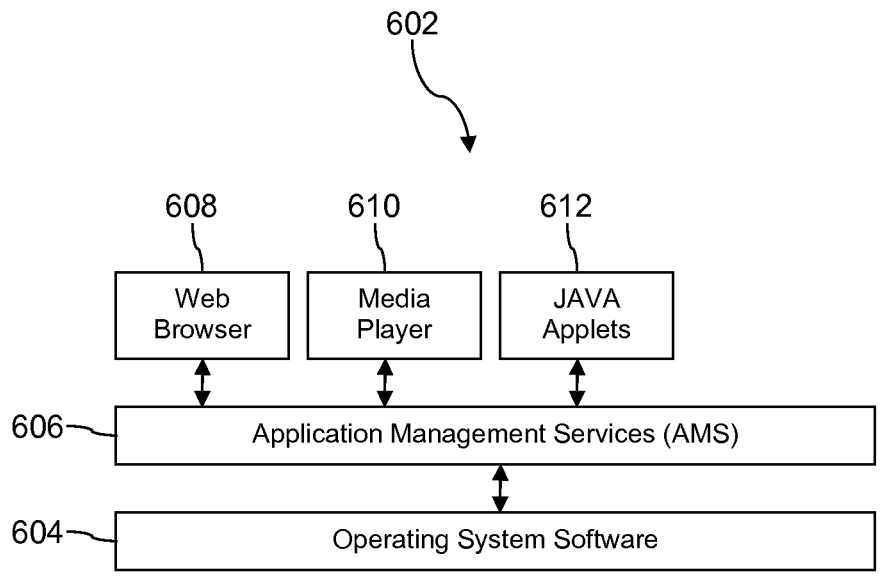
FIG. 6A is a block diagram of a software architecture of a user equipment according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the user equipment 400. Also shown in FIG. 6A are a web browser application 608, a media player application 610, and JAVA applets 612. The web browser application 608 may be executed by the user equipment 400 to browse content and/or the Internet, for example when the user equipment 400 is coupled to a network via a wireless link. The web browser application 608 may permit a user to enter information into forms and select links to retrieve and view web pages. The media player application 610 may be executed by the user equipment 400 to play audio or audiovisual media. The JAVA applets 612 may be executed by the user equipment 400 to provide a variety of functionality including games, utilities, and other functionality.

Figure 6B:
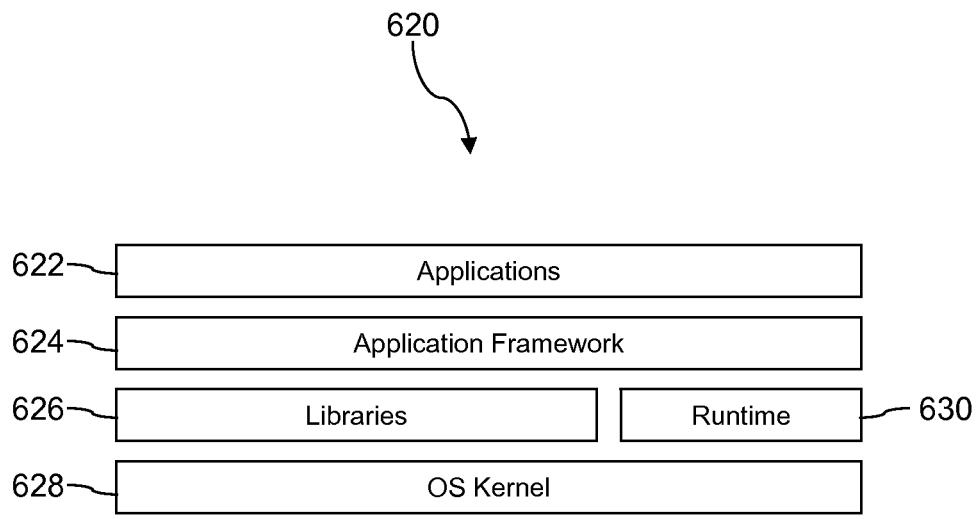
FIG. 6B is a block diagram of another software architecture of a user equipment according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main user equipment chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete Trusted Execution Environment (TEE) may be implemented through the use of the trusted security zone hardware and software architecture. The Trusted Execution Environment is an execution environment that is parallel to the execution environment of the main user equipment operating system. The Trusted Execution Environment and/or the trusted security zone may provide a base layer of functionality and/or utilities for use of applications that may execute in the trusted security zone. For example, in an embodiment, trust tokens may be generated by the base layer of functionality and/or utilities of the Trusted Execution Environment and/or trusted security zone for use in trusted end-to-end communication links to document a continuity of trust of the communications. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the user equipment into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution Environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credentials and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the user equipment which may execute in the normal partition operating system described above. The trusted security zone runs a separate operating system for the secure partition that is installed by the user equipment manufacturer or vendor, and users are not able to install new applications in or alter the contents of the trusted security zone.

Figure 7:
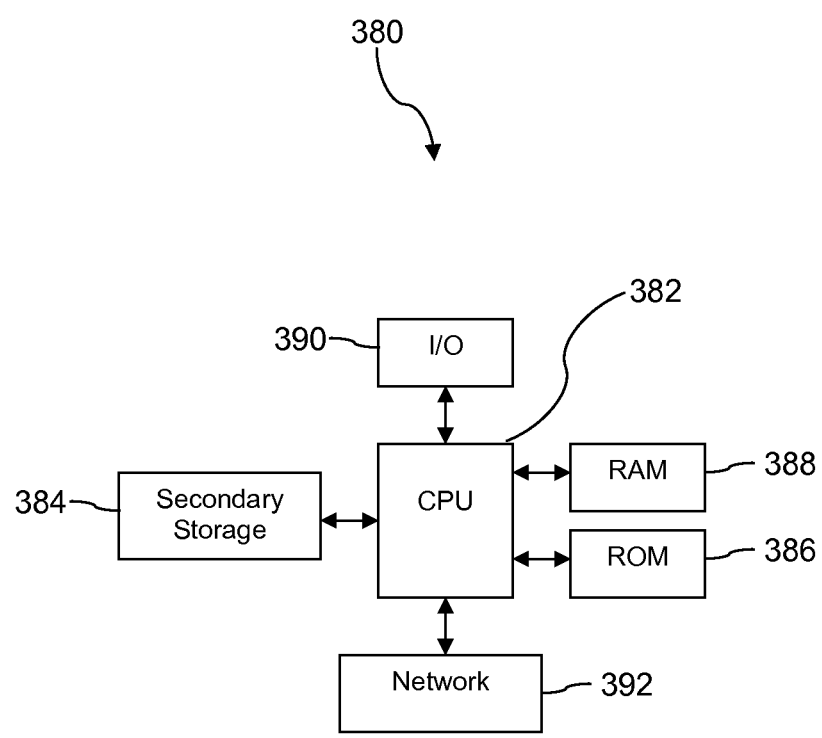
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment, comprising:
   a processor of the user equipment;
   a memory of the user equipment;
   a trusted security zone of the user equipment, wherein the trusted security zone provides hardware assisted trust and is implemented by partitioning hardware and software resources into a secure partition and a normal partition;
   a ticket generator stored in the secure partition in the trusted security zone of the user equipment to generate a plurality of access codes; and
   a code generator stored in the secure partition in the trusted security zone of the user equipment configured to:
   generate a different one-time-password for each of the plurality of access codes, wherein the one-time-password is not displayed on the user equipment, store the one-time-password in the secure partition in the trusted security zone, transmit the one-time-password to a trusted server through a trusted channel, wherein the one-time-password generated in the trusted security zone of the user equipment and received by the trusted server from the user equipment is stored in the trusted server, responsive to an associated access code from the plurality of access codes being displayed and upon request of a user of the user equipment, display the one-time-password, wherein a request is sent to the trusted server from a point of sale or a workstation for the one-time-password associated with the access code, and wherein access is granted to the user equipment in response to a verification of the associated access code and the one-time-password from the user equipment and the one-time-password stored by the trusted server matching, and invalidate the one-time-password promptly after the display ends.

2. The user equipment of claim 1, wherein the one-time-password is integrated into a file that constitutes the associated access code in text.

3. The user equipment of claim 1, wherein the one-time-password is separated from a file that constitutes the associated access code.

4. The user equipment of claim 1, wherein the one-time-password is generated by a random number generating algorithm, and wherein the one-time-password is invalidated within one minute after the display ends.

5. The user equipment of claim 4, wherein the one-time-password is generated based on a seed chosen by the trusted server.

6. The user equipment of claim 4, wherein the one-time-password is generated based on a previously generated one-time-password.

7. The user equipment of claim 4, wherein the one-time-password is generated based on time-synchronization between the trusted server and the user equipment.

8. A method of generating and verifying one-time-passwords for user equipments, comprising:

generating, by a code generator stored in a trusted security zone in a memory of a user equipment, a different one-time-password associated with each of a plurality of access codes, wherein the trusted security zone provides hardware assisted trust and is implemented by partitioning hardware and software resources into a secure partition and a normal partition, and wherein the one-time-password is not displayed on the user equipment at the time of generation;

storing the one-time-password in the secure partition in the trusted security zone of the user equipment;

transmitting the one-time-password to a trusted server through a trusted channel, wherein the one-time-password generated in the trusted security zone of the user equipment and received by the trusted server from the user equipment is stored in the trusted server;

responsive to an associated access code being displayed at a point of sale (POS), displaying the one-time-password;

transmitting, by the POS, a request to the trusted server for a one-time-password associated with the access code;

comparing the one-time-password displayed on the user equipment with the one-time-password stored by and received from the trusted server;

responsive to the associated access code having been verified and the one-time-password from the user equipment and the one-time-password stored by the trusted server matching, granting access associated with the access code to the user equipment; and invalidating the one-time-password promptly after the display ends.

9. The method of claim 8, further comprising utilizing a location-based service to recognize the proper POS location to display the access code and the one-time-password.

10. The method of claim 8, wherein the one-time-password is displayed upon request by a user of the user equipment.

11. The method of claim 10, wherein the user of the user equipment enters a code for the code generator to display the one-time-password, and wherein the one-time-password is invalidated within 30 seconds after the display ends.

12. The method of claim 8, wherein the access code is for at least one of a plane ticket, a sports event access, a music event access, a hotel room reservation, or a secure space access, and wherein the secure spaces access is secure access to one of a building, a floor, or a room.

13. The method of claim 8, wherein the one-time-password is invalidated upon receipt of a command from the trusted server.

14. The method of claim 13, wherein the command from the trusted server is received by the user equipment through an application programming interface (API).

15. A method of generating and verifying one-time-passwords for user equipments, comprising:

generating, by a code generator stored in a trusted security zone in a memory of a user equipment, a different one-time-password associated with each of a plurality of access codes, wherein the trusted security zone provides hardware assisted trust and is implemented by partitioning hardware and software resources into a secure partition and a normal partition, and wherein the one-time-password is not displayed on the user equipment;

storing the one-time-password in the secure partition in the trusted security zone of the user equipment;

transmitting the one-time-password to a trusted server through an encrypted channel, wherein the one-time-password generated in the trusted security zone of the user equipment and received by the trusted server from the user equipment is stored in the trusted server;

responsive to an associated access code being displayed to a work station, transmitting the one-time-password to the work station through a dedicated channel, wherein the one-time-password is not displayed on the user equipment or the work station;

transmitting, by the work station, a request to the trusted server for a one-time-password associated with the access code;

comparing the one-time-password received from the user equipment with the one-time-password stored by and received from the trusted server;

examining the access code;

responsive to the associated access code having been verified and the one-time-password from the user equipment and the one-time-password stored by the trusted server matching, granting access associated with the access code to the user equipment; and invalidating the one-time-password after granting access to the user equipment.

16. The method of claim 15, wherein the user equipment is one of a laptop computer, a notebook computer, a tablet computer, a mobile phone, a personal digital assistant (PDA), a media player, a headset computer, a wearable computer, a game console, an Internet digital media streaming device, a television, or another network/communications capable device.

17. The method of claim 15, wherein the user equipment establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

18. The method of claim 15, wherein the one-time-password is generated by a random number generating algorithm.

19. The method of claim 18, wherein the one-time-password is generated based on a seed chosen by the trusted server.

20. The method of claim 18, wherein the one-time-password is generated based on a previously generated one-time-password.

\* \* \* \* \*